United States Patent [19]
Sy

[11] Patent Number: 5,457,277
[45] Date of Patent: Oct. 10, 1995

[54] MULTIPLE REBOILER SYSTEM

[75] Inventor: Angel Sy, Katy, Tex.

[73] Assignee: Chemical Research & Licensing Company, Pasadena, Tex.

[21] Appl. No.: 258,934

[22] Filed: Jun. 13, 1994

[51] Int. Cl.⁶ ..................................................... B01D 3/00
[52] U.S. Cl. ........................ 202/154; 202/155; 202/173;
202/235; 203/23; 203/25; 203/27; 203/78;
203/DIG. 8; 203/DIG. 9
[58] Field of Search .................................. 203/23, 27, 25,
203/DIG. 8, 78, DIG. 9; 202/154, 155,
173, 172, 235; 196/134

[56] References Cited

U.S. PATENT DOCUMENTS

| 2,577,701 | 12/1951 | Deming et al. | 203/27 |
|---|---|---|---|
| 3,402,124 | 9/1968 | Jones | 203/27 |
| 3,442,770 | 5/1969 | Wentworth et al. | 203/27 |
| 3,494,861 | 2/1970 | Munro | 203/27 |
| 4,129,606 | 12/1978 | Gewartowski | 203/23 |
| 4,162,198 | 7/1979 | Stockburger et al. | 203/23 |
| 4,273,620 | 6/1981 | Knobel | 203/23 |
| 4,778,567 | 10/1988 | Kakimoto et al. | 203/23 |
| 5,035,776 | 7/1991 | Knapp et al. | 203/27 |
| 5,116,485 | 5/1992 | Krisa | 203/23 |

Primary Examiner—Virginia Manoharan
Attorney, Agent, or Firm—Kenneth H. Johnson

[57] ABSTRACT

To heat the circulating reboiler streams of multiple distillation columns a fired reboiler is provided for a first column requiring the most heat. A portion of the bottoms from the first column is passed through the tubes of the heater in the fired reboiler and recycled to the first column as is normal. A slip stream is taken from the recycle after heating and passed on to provide heat by indirect heat exchange to a second reboiler and if desired other reboilers or heat exchangers. The slip stream may then be recycled to the bottoms of the first column directly or to the circulating steam of the first reboiler. A portion of the recycled slip stream can be taken as feed into the second column.

5 Claims, 1 Drawing Sheet 5,457,277

MULTIPLE REBOILER SYSTEM

BACKGROUND OF THE INVENTION

1. Field of the Invention

The present invention relates to apparatus for heat input into the reboiler stream of distillation or reaction distillation columns. More particularly the invention relates to the use of a single fired heater to provide heat to several reboiler streams. Most particularly the invention relates to the use of a slip stream from a reboiler stream which has been heated by a fired reboiler as a heat transfer medium to heat other reboiler streams.

2. Related Information

In fractional distillation heat must be provided to drive the boiling of the components to be separated. Generally the heat is provided by taking a portion of the bottoms from the distillation column and passing it through a heat exchanger to add heat and then recycling the heated portion of the bottoms back to the distillation column. Some amounts of heat may be added by "pump arounds" wherein the liquid from individual trays in the column are circulated through heat exchangers, but in most cases, the sole or principal source of heat input to a distillation column is through the recirculation of bottoms through a reboiler.

In a reaction distillation column there is concurrent reaction of components and separation by fractional distillation of the reaction products from the reactants. The reaction may be exothermic or endothermic. Even if the reaction is exothermic some heat must be provided to initiate the reaction and to continue to drive the separation. This heat is generally provided by a reboiler as in traditional distillation columns. Of course heat must be provided when the reaction is endothermic. In addition to the latent heat of vaporization the reboiler must also add the heat necessary to sustain the reaction.

The heat in a reboiler can be provided either from a heat exchange medium, such as steam, or by passing the bottoms material through tubes which are surrounded by flames in a fire box—a fired reboiler. The type of reboiler is dependent upon the amount of heat required and upon the temperature of the heated fluid. Generally fired reboilers are more economical when large amounts of heat are required or when temperature is high.

Plant operating complexities and difficulties increase substantially with multiple fire reboilers. One usual alternative to multiple fired reboiler is the use of a hot oil system with a single common fired heater. While a hot oil system is simpler than multiple fired reboilers it is substantially more expensive.

It is known in industry to heat a first process stream from a second process stream by indirect heat exchange to recover heat from the second that would otherwise be lost. For example heat from the overheads vapor from one column may be used to heat the reboiler of another or the heat from the bottoms product from one stream may be used to heat the reboiler of another column.

It is a feature of the present invention to provide a simple alternative to multiple fired reboilers without the expense of a hot oil system.

SUMMARY OF THE INVENTION

Briefly the invention is the utilization of the heated bottoms from one distillation column as a heat exchange medium to heat the reboilers of other distillation columns. A single fired reboiler is provided for a first column requiring the most heat. A portion of the bottoms from the first column is passed through the tubes of the heater in the fired reboiler and recycled to the first column as is normal. A slip stream is taken from the recycle after heating and passed on to provide heat by indirect heat exchange to a second reboiler and if desired other reboilers or exchangers. The slip stream may then be recycled to the bottoms of the first column directly or if cool enough, combined with the bottoms product from the first column.

DESCRIPTION OF THE PREFERRED EMBODIMENT

Figure 1:
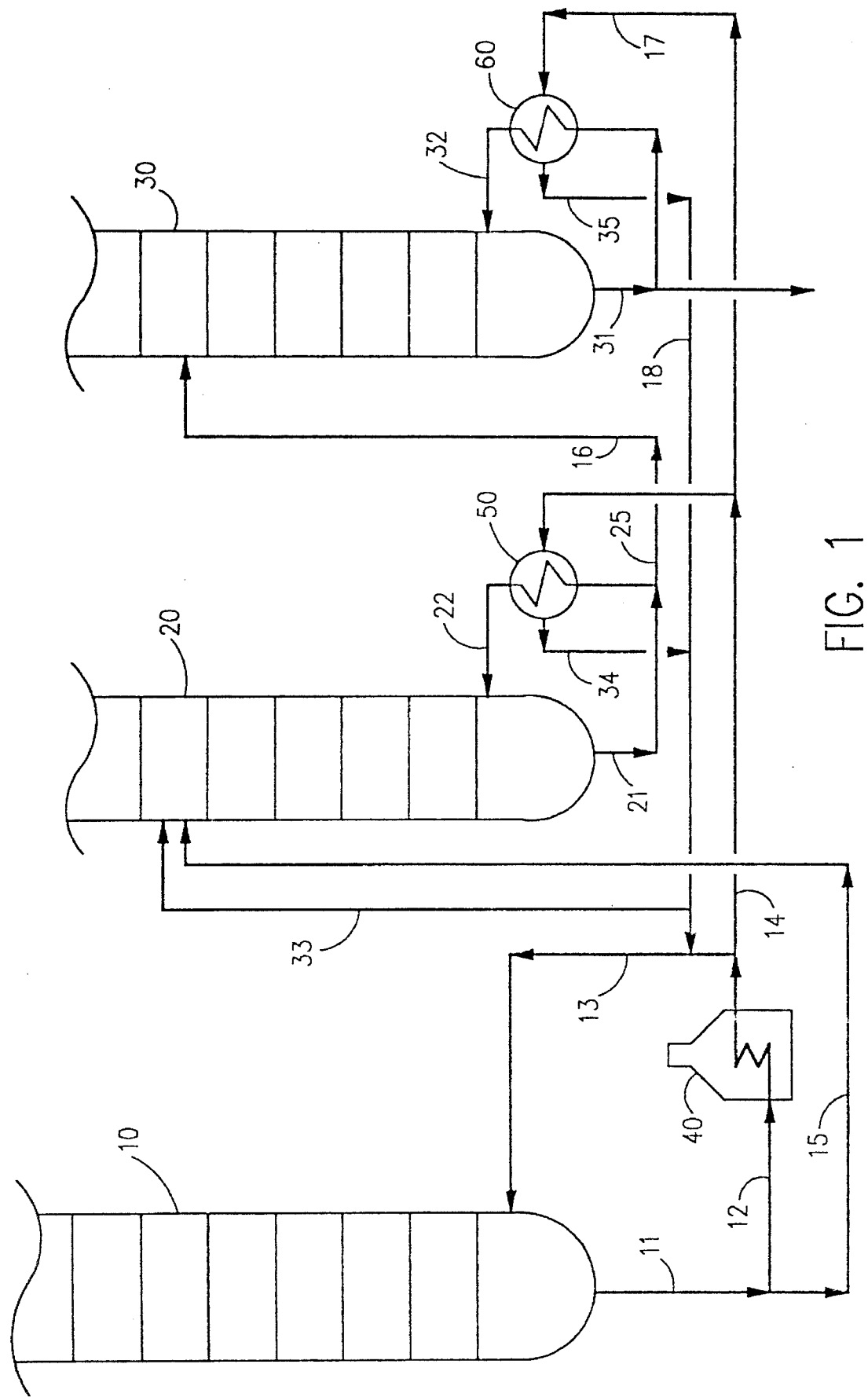
FIG. 1 is simplified flow diagram in schematic form showing one embodiment of the present invention.

The present invention is useful where there are multiple distillation columns each of which requires significant heat input into the reboiler liquid. One particular process in which the invention is useful is in the production of cumene utilizing a catalytic distillation column reactor for reacting benzene with propylene. In such a process benzene is reacted with propylene in a distillation column reactor to form cumene while the unreacted benzene is simultaneously separated from the cumene product by fractional distillation. The distillation column reactor requires a fired reboiler to strip the benzene from the cumene product. Also in the same general production scheme the overhead condensers on the cumene and PIPB (polyisopropyl benzene) columns may be used to generate medium pressure steam. The overheads temperature and heat content to generate the medium pressure requires a column pressure that would normally require a fired reboiler or a hot oil circulation system. In lieu of either multiple fired reboilers or a hot oil system the benzene stripper reboiler circulating stream is controlled at the proper temperature and a portion is withdrawn as a heat exchange medium for the two smaller reboilers.

Referring now to the FIGURE a description of the embodiment for cumene production is shown. Only the lower sections of the distillation column reactor 10, the cumene column 20 and the PIPB column 30 are shown for simplicity. The controlling temperatures are the benzene stripper reboiler and the overheads from the two smaller columns which are used to generate medium pressure steam. In this illustration the temperature of the benzene reboiler circulating stream in flow line 13 is 573° F. at an overhead pressure of 107 psig while the temperature of the cumene column overheads is 398° F. at overhead pressure of 33 psig and the PIPB column overheads is 414° F. To maintain the overheads temperatures of the two smaller columns the reboiler circulating temperature must be 520° F. for the cumene column reboiler circulating stream in flow line 22 and 537° F. for the PIPB reboiler circulating stream in flow line 32 under these pressure conditions.

To utilize the benzene stripper reboiler circulating stream 13 to heat the other two reboilers a portion of the bottoms from the outlet line 11 passes via line 12 through a first reboiler 40, which comprises a fired heater. A slip stream from the heated benzene stripper reboiler recirculating stream is taken via conduit 14 and used to provide heat in a second reboiler 50, which comprises an indirect heat exchanger for the cumene column 20 and a third reboiler 60, which comprises an indirect heat exchanger for PIPB column 30. A first portion of the slip stream is passed by conduit means 16 to reboiler 50 and a second portion is passed by conduit means 17 to reboiler 60. After providing heat to the heat exchangers the slip stream is passed by return conduits 34, 35 and 18 back to benzene stripper recirculating stream 13.

The bottoms from column 10, which do not flow through the reboilers, flow to cumene column 20 via line 15. Alternatively, a portion of the returned slip stream in line 18 can be used as feed to cumene column 20 via line 33 in lieu of line 15 for piping and flow economy. The bottoms from column 20 flow through outlet line 21 and line 25 to PIPB column 30, with a portion being taken into reboiler 50 via line 22 to be heated by indirect heat exchange with the heated bottoms from column 10. Similarly a portion of the material in the bottoms outlet line 31 from column 30 is passed through the third reboiler 60 via line 32 where it is also heated by indirect heat exchange with the heated bottoms from column 10.

A heat balance is given for a 465,600 pound/day cumene plant in TABLE I.

TABLE I

| Stream No. | 12 | 13 | 14 | 16 | 17 | 22 | 32 |
| --- | --- | --- | --- | --- | --- | --- | --- |
| Flow rate, Lbs/hr | 435,300 | 435,300 | 158,600 | 115,500 | 19,500 | 115,700 | 21,600 |
| Temp. °F. | 524 | 573 | 590 | 590 | 590 | 523 | 541 |
| H, MM BTU | 0 (base) | 15.3 | 7.5 | 5.5 | 2.0 | 4.3 | 0.8 |

The invention claimed is:

1. A combination comprising:
    (a) a first distillation vessel having a first bottoms outlet conduit,
    (b) a first reboiler which is fired and has a first heat exchange conduit, communicating with and extending from said first bottoms outlet conduit through said first reboiler and back to said first distillation vessel,
    (c) a second distillation vessel having a second bottoms outlet conduit,
    (d) a second reboiler having a second heat exchange conduit, communicating with and extending from said second bottoms outlet conduit through said second reboiler and back to said second distillation vessel,
    (e) a slip stream conduit communicating with said first heat exchange conduit and through said second reboiler for providing heat from said first reboiler to said second reboiler by indirect heat exchange and
    (f) a third distillation vessel having a third bottoms outlet conduit and a third reboiler having a third heat exchange conduit, communicating with and extending from said third bottoms outlet conduit through said third reboiler and back to said third distillation vessel, said slip stream conduit extending through said third reboiler for providing heat from said first reboiler to said third reboiler by indirect heat exchange.

2. A combination comprising:
    (a) a first distillation vessel having a first bottoms outlet conduit,
    (b) a first reboiler having a first heat exchange conduit, communicating with and extending from said first bottoms outlet conduit through said first reboiler and back to said first distillation vessel,
    (c) a second distillation vessel having a second bottoms outlet conduit,
    (d) a second reboiler having a second heat exchange conduit, communicating with and extending from said second bottoms outlet conduit through said second reboiler and back to said second distillation vessel,
    (e) a slip stream conduit communicating with said first heat exchange conduit and through said second reboiler for providing heat from said first reboiler to said second reboiler by indirect heat exchange and
    (f) a first slip stream return conduit communicating with the slip stream conduit and extending from said second reboiler to said first heat exchange conduit.

3. The combination according to claim 2 wherein said first slip stream return conduit rejoins with said first heat exchange conduit at a point downstream of the slip stream conduit.

4. The combination according to claim 2 wherein a second slip stream return conduit communicates with the slip stream conduit and extends from said third reboiler to said first heat exchange conduit.

5. The combination according to claim 4 wherein a conduit extends from said first slip stream return conduit downstream of the second reboiler to a feed location of said second column and in which a portion of slip stream flow is fed to the second column.

* * * * *